United States Patent Office 3,352,518
Patented Nov. 14, 1967

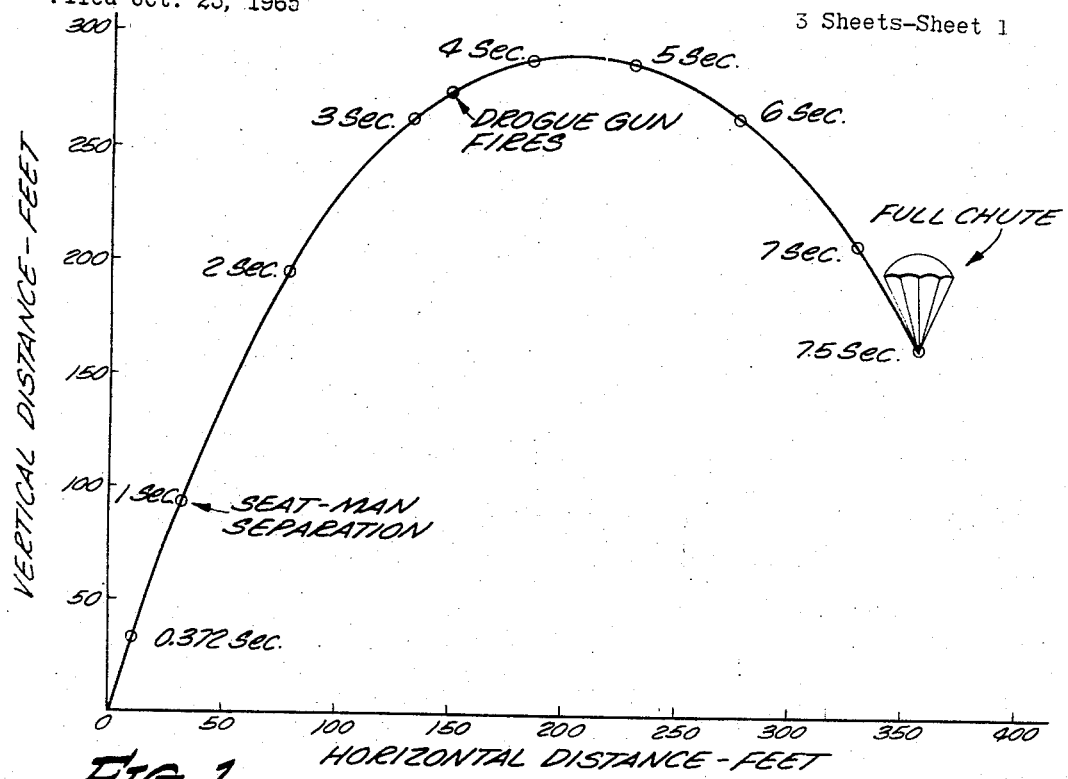
FIG. 1.
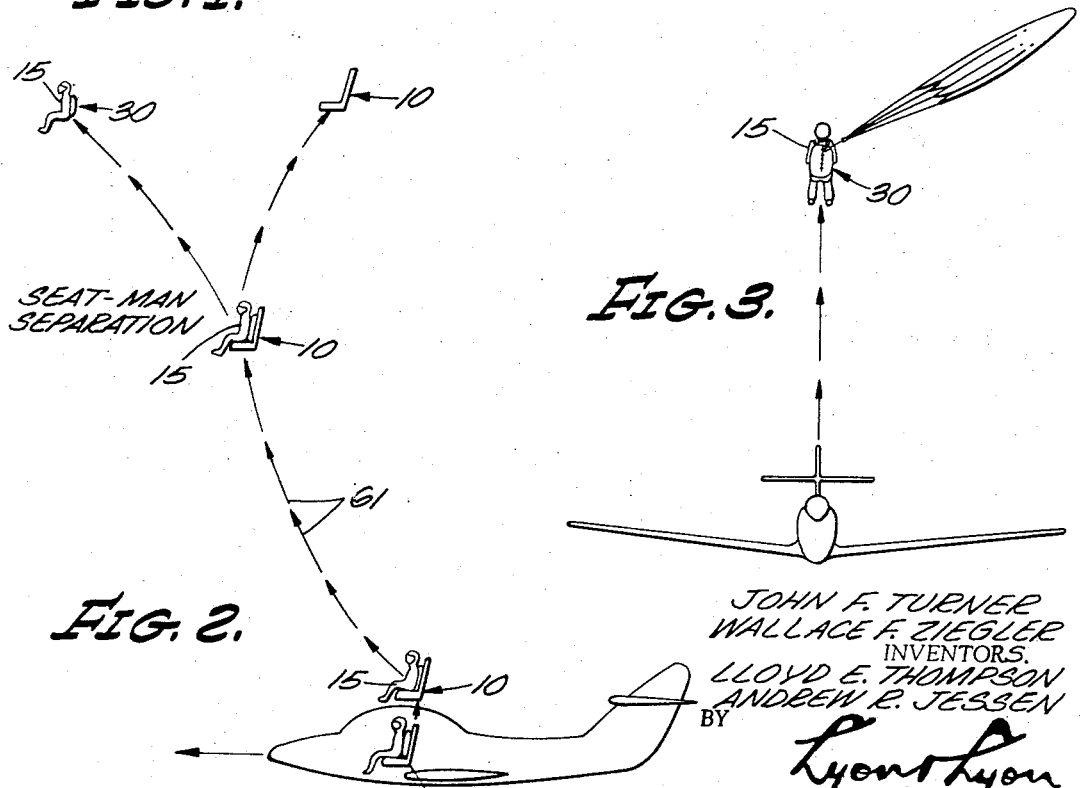
FIG. 2.
FIG. 3.
JOHN F. TURNER
WALLACE F. ZIEGLER
LLOYD E. THOMPSON
ANDREW R. JESSEN
INVENTORS.
BY Lyon + Lyon
ATTORNEYS

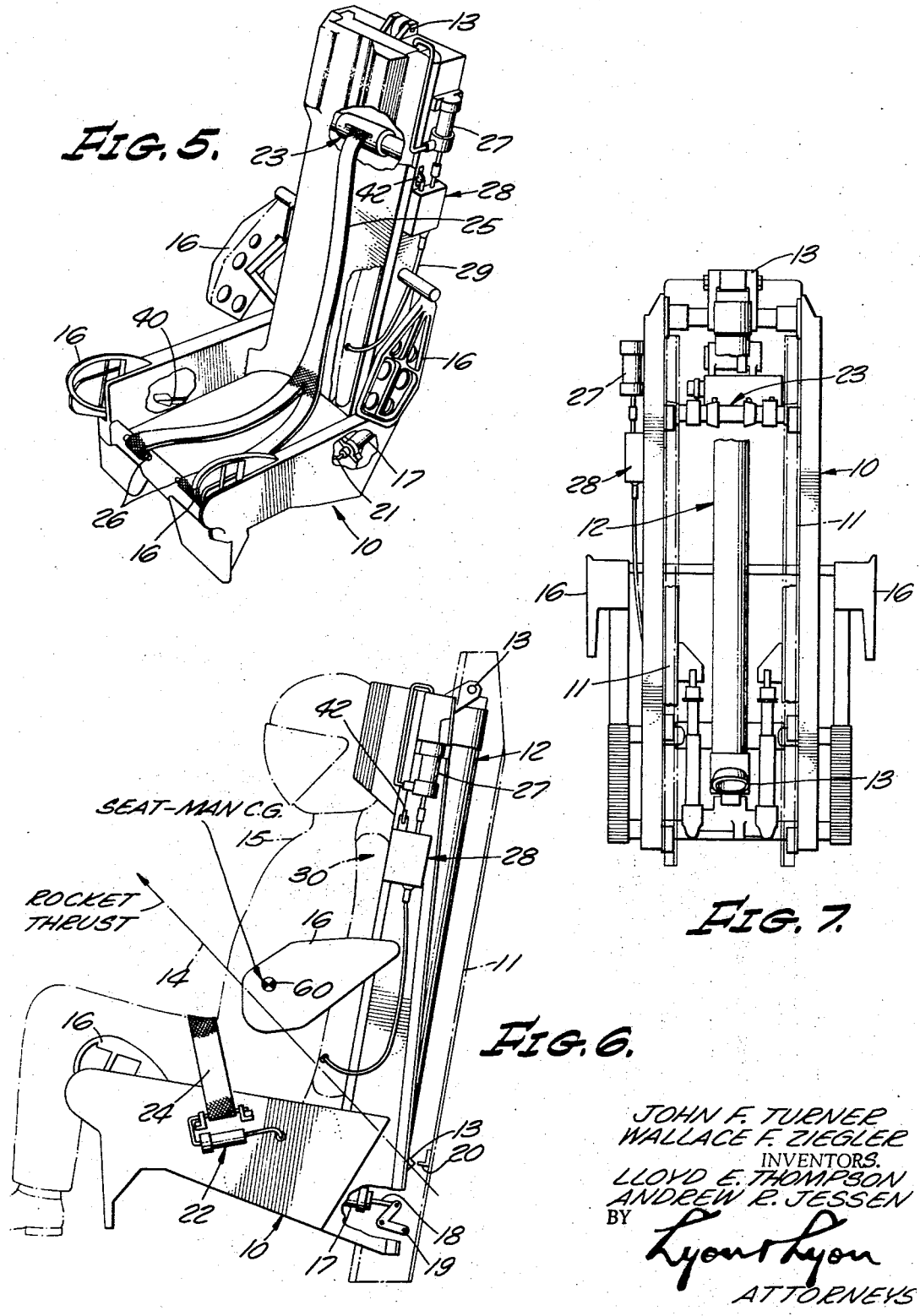

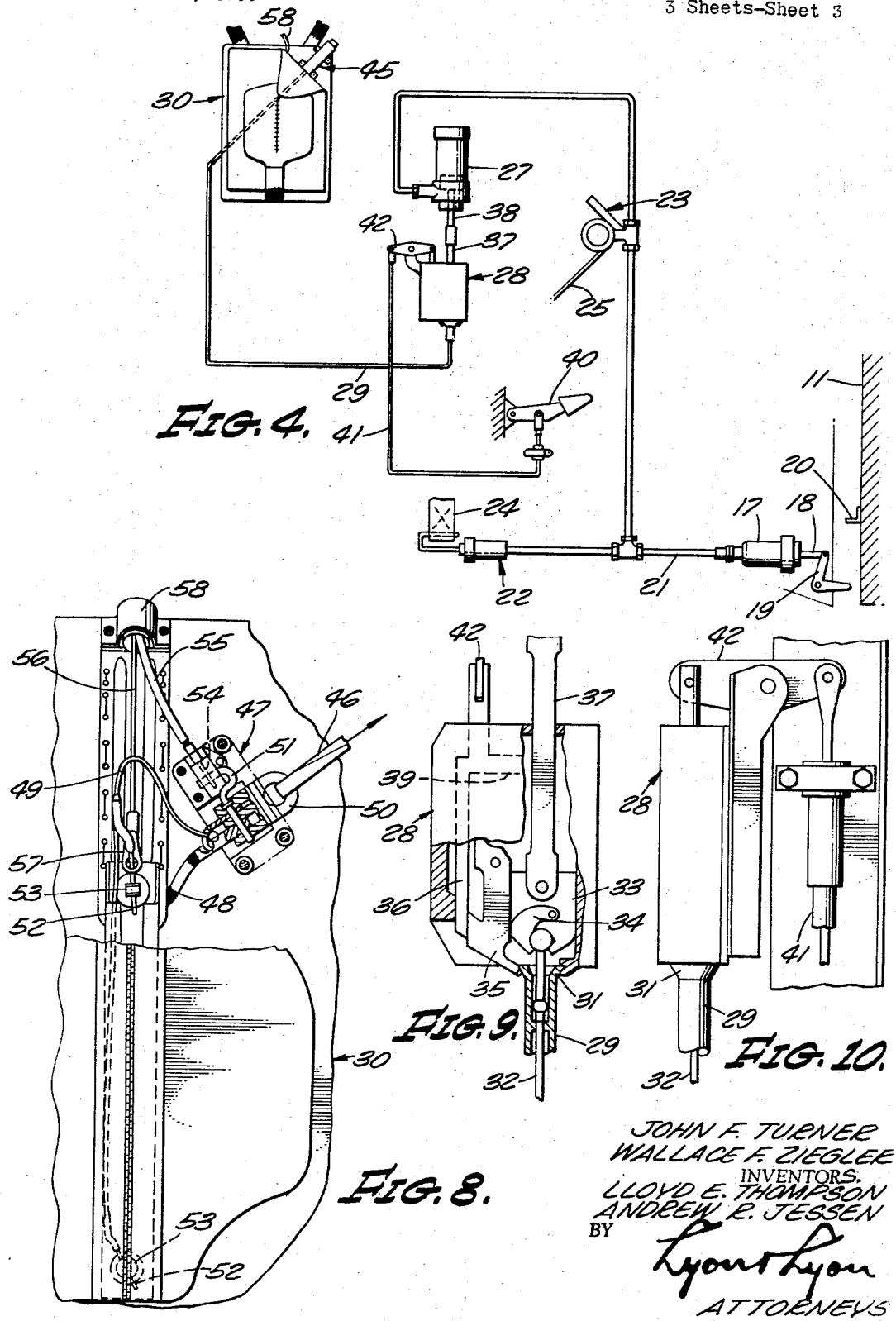

3,352,518
PERSONNEL EJECTION SYSTEM FOR AIRCRAFT
John F. Turner, Granada Hills, Wallace F. Ziegler, Glendale, Lloyd E. Thompson, Van Nuys, and Andrew R. Jessen, Glendale, Calif., assignors to Walter Kidde & Company, Inc., Belleville, N.J., a corporation of New York
Filed Oct. 23, 1965, Ser. No. 502,834
12 Claims. (Cl. 244—122)

ABSTRACT OF THE DISCLOSURE

A personnel ejection system for aircraft which accomplishes safe recovery under all conditions of speed and altitude by means of the same sequence and operation comprising the upward ejection of the seat and man with rocket propulsion for a short duration followed immediately by physical and forceable separation of the man and seat and then a substantial time delay before the deployment of the parachute by a drogue gun directed laterally of the man with all of the functions being accomplished automatically and initiated by departure of the seat from the aircraft and with the time delay serving to allow deceleration of the man under high aircraft speeds or maximum upward displacement of the man under low altitude conditions. The integrated system includes the rocket mounted on the rear of the seat with the thrust line directed below the combined center of gravity of the man and seat whereby tumbling is minimized and always in the rearward direction.

---

This invention relates to a system for accomplishing the escape of a person from an aircraft under emergency conditions and, in particular, is directed to such a system which is equally effective under conditions of high altitude and high speed as well as the static condition of zero altitude and zero speed. More particularly the system is adapted for military applications wherein there is a greater likelyhood of sudden emergencies and the rapid ejection and recovery of the pilot and crew members is essential.

A variety of pilot ejection systems have been employed on military aircraft in recent years in an effort to more safely separate the pilot from the aircraft under emergency conditions. Powered ejection systems are necessitated, in part, by reason of the high speeds attained by present day aircraft and the inability of a man to physically extricate himself with any degree of safety. Another factor is the rapidity with which an emergency occurs in present day aircraft. This latter factor has led to the desirability of an ejection system which will safely and rapidly separate a man from a standing aircraft which is a condition commonly known as "zero-zero," that is, zero altitude and zero speed. Similarly, safe ejection is highly desirable at those most critical times of take off and landing where altitude is substantially zero.

Many conventional ejection systems operate satisfactorily at reasonable altitudes and any speed since all that is required is to propel the man in his seat from the aircraft in such a manner as to avoid the aircraft tail structure and to thereafter open the parachute before reaching the ground. Some systems separate the seat from the man before opening the parachute and others retain the man in the seat. One difficulty which is encountered even in ejecting at safe altitudes is that the man's speed must be less than a given value or the parachute will be destroyed upon opening. Therefore it is conventional to provide a substantial time delay before opening the parachute to permit the man's speed to reduce from the speed of the aircraft to a safe level. However this normally employed substantial time delay is not tolerable under zero-zero conditions since this will not provide sufficient time for the parachute to open before the man reaches the ground.

The propelling force which may be applied to eject the man from the aircraft is limited by the physical capabilities of a pilot to withstand the forces of such propulsion and therefore it is not possible to merely employ an ejection system which propels the man to an extreme altitude above the plane to permit time to open the parachute. Moreover the propelling force will usually tend to cause the man and seat to tumble and if such force is applied for a substantial duration the tumbling may result in the man-seat combination being urged in a downward direction. To combat this effect many conventional systems employ drag lines or parachutes which stabilize the direction of flight but these have the inherent disadvantage of resisting the propelling force thereby reducing the attained altitude.

Still another difficulty encountered in conventional ejection systems is in properly and rapidly deploying the parachute. One factor is that the man may be tumbling as mentioned above at the time the parachute is being deployed and therefore he may become entangled with the parachute lines. Another factor in systems which separate the seat from the man before opening the parachute is that the seat may become entangled with the parachute.

It is the combination of all these factors that has heretofore thwarted every attempt to provide an ejection system capable of consistent safe recovery of personnel from aircraft under all conditions.

Accordingly the principal object of the subject invention is to provide an aircraft personnel ejection system employing carefully integrated components and steps for accomplishing the safe egress of a man from an aircraft under all conditions of altitude and speed. Specifically the system of the invention includes a rocket for propelling the seat and man upwardly from the aircraft under tolerable force levels and during a short time duration with the force directed so as to prevent downward tumbling, an automatically initiated arrangement for separating the seat and man, means initiating the parachute deployment device separate from the actual physical separation of the seat and man, delaying the parachute deployment for a sufficient time duration to permit the separation of the seat and man a substantial distance, and deploying the parachute at approximately the highest altitude achieved by the man with such deployment being accomplished rapidly by a drogue gun and directed laterally to prevent entanglement by reason of a tumbling motion.

An object of this invention is to provide a predetermined timing sequence among the various steps of the ejection and recovery system which will adequately satisfy the diverse timing requirements between a zero-zero condition and a condition of high speed and altitude.

Another object of this invention is to provide an arrangement for propelling the seat-man combination in a consistently upward direction without the use of guiding drag lines or parachutes by applying the propelling force in a direction closely spaced a predetermined range of distances from the center of gravity of the seat-man combination.

A further object of this invention is to provide an arrangement for initiating all of the succeeding steps of the ejection and recovery system by the departure of the seat from the aircraft and to control the occurrence of those steps solely by time delays from the original initiation.

Other and more detailed objects and advantages of this invention will appear from the following description and the accompanying drawings, wherein:

FIGURE 1 is an elevation view in the form of a graph illustrating the timing and distance relationships of an average ejection sequence employing the system of this invention.

FIGURE 2 is an elevation view illustrating the typical ejection path of the seat and man relative to the aircraft.

FIGURE 3 is a rear elevation view showing the lateral relationship of the parachute deployment although the vertical spacing between the man and aircraft is substantially less than will actually occur.

FIGURE 4 is a diagrammatic illustration of the various components of the system for accomplishing the seat-man separation and parachute deployment as operated by the device which is initiated by the departure of the seat from the aircraft.

FIGURE 5 is a prospective view of a typical aircraft seat having the various components mounted thereon for accomplishing the system of this invention.

FIGURE 6 is an elevation view of the seat and man and illustrates the spacing relationship between the center of gravity thereof and the direction of propelling force.

FIGURE 7 is a rear elevation view of the seat.

FIGURE 8 is a fragmentary rear view of the parachute pack illustrating the selectively operable means for either automatic or manual parachute deployment.

FIGURE 9 is a fragmentary elevation view, with portions in section, of the device for initiating the parachute deployment means and thereafter detaching the device from the parachute.

FIGURE 10 is a side elevation view of the device of FIGURE 9 showing the manual release mechanism.

Referring in detail to FIGURES 4 through 10, the aircraft seat, generally designated 10, may be any conventional type of ejection seat although a specific conventional seat may require certain structural modifications to accommodate the components employed in the system of this invention. The seat is mounted for guided sliding movement along a pair of spaced rails 11 which are in turn mounted in the aircraft in a relatively vertical attitude. Normally the seat 10 will be fixed relative to the rails 11 during operation of the aircraft although means may be provided for adjusting the height of the seat to accommodate the particular man. A rocket 12 is mounted on the back of the seat and has its upper end connected by a yoke 13 to the frame of the seat 10. The rocket 12 is of a generally conventional type although the operating characteristics of the rocket are specially selected to accomplish the objectives of this system as will be described in detail hereafter. As with a conventional rocket used with ejection seats, the rocket 12 has a nozzle 13 directed downwardly and rearwardly whereby the propelling thrust force of the rocket is directed upwardly and forwardly in a direction represented by the arrow 14 in FIGURE 6. The rocket 12 includes an initial ballistic stage of short duration for driving the seat 10 up the rails 11 and out of the aircraft whereupon the catapulting thrust force of the rocket 12 ignites and produces the thrust force in the direction of arrow 14.

The ejection sequence is initiated by the man 15 occupying the seat through the use of a conventional lever or other means to release the seat and ignite the ballistic portion of the rocket 12. The seat 10 may include conventional arm and leg protectors 16 which swing upwardly into a position for inhibiting lateral movement of the arms and legs during ejection. A gas pressure generating initiator 17 is mounted on the seat 10 and has a rearwardly extending plunger 18 which must be pulled to actuate the initiator. A bell crank 19 is pivotally mounted on the seat and connected to the plunger 18 and the bell crank has a rearwardly extending arm portion adapted to engage a fixed stop 20 mounted on the rails 11 as the seat 10 is ejected from the aircraft. Rotation of the bell crank 19 by engaging the stop 20 actuates the initiator 17 in direct response to the departure of the seat 10 from the aircraft. The initiator 17 has a built-in time delay of one second from the instant that the plunger 18 is pulled outwardly by the bell crank 19 until the pressurized gas is sent out through the tubing 21 to the various operative components hereinafter described. This one-second time delay is preselected to coordinate with the various operations in the system.

The pressurized gas from initiator 17 proceeds through tubing 21 to a conventional lap belt release device 22 and a seat-man separator 23. The lap belt release device 22 immediately and completely releases the seat or lap belt 24 which normally restrains the man 15 in the seat 10. The seat-man separator 23 is of the conventional reel type wherein a strap or web 25 extends from mounting brackets 26 on the front of the seat to the separator 23 at the upper-rear of the seat and the man 15 sits on the web 25. Actuation of the separator 23 by the pressurized gases reels in the web 25 to forceably throw the man 15 from the seat 10. The operation of the seat-man separator 23 is inherently slower than the operation of the lap belt release device 22 and therefore it is insured that the lap belt is released before the web 25 is tightened. Similarly a cylinder and piston actuator 27 is inherently faster in its operation than the separator 23 and therefore the pressurized gases cause complete actuation thereof before separation of the seat and man.

A parachute actuating mechanism 28 is mounted on the side of the seat 10 immediately below the actuator 27. The mechanism 28 is a somewhat conventional device which is selectively operable for either actuating the automatic parachute deployment means or releasing such automatic parachute deployment means for permitting the man 15 to climb out of the cockpit without going through the ejection cycle. Referring particularly to FIGURES 9 and 10, the mechanism 28 includes a housing to which is connected a releasable actuating cable 29 extending from the parachute pack 30. The actuating cable 29 is of the type which includes a flexible outer housing 31 encircling a movable cable 32 and a pull on the cable 32 serves to initiate the parachute deployment means in the parachute pack. A block 33 is slidably mounted in the mechanism 28 and has a claw portion including a movable claw 34 for gripping a ball on the end of cable 32. The belled end of housing 31 fits in the lower end of mechanism 28 and is releasably held there by a pivotable lever 35. A slide bar 36 holds the lever in the engaging position shown in FIGURE 9. A connecting rod 37 is connected between the piston 38 of actuator 27 and the slide block 33 of mechanism 28. Operation of actuator 27 causes upward movement of slide block 33 thereby pulling the cable 32 to initiate the parachute deployment means. Toward the end of the upward stroke of slide block 33 the claw 34 pivots outwardly to release the ball on cable 32 and then engages a protruding portion 39 of the slide bar 36 to lift the slide bar a sufficient distance to allow the lever 35 to pivot away from the belled end of housing 31. In this manner the actuating cable 29 is first actuated and then released from the mechanism 28. This is essential since the seat 10 to which the mechanism 28 is attached and the man 15 to which the parachute 30 is attached are separated immediately thereafter by the separator 23. However if the man 15 desires to leave the seat 10 while wearing his parachute he may pull a ditching lever 40 which operates a cable 41 to pivot a bell crank 42 and in turn lift the slide bar 36 to allow the lever 35 to pivot thereby releasing both the housing 31 and the cable 32 of the actuating cable 29 without pulling the cable 32.

The parachute actuating cable 29 is connected to the automatic parachute deployment mechanism 45. Mechanism 45 may be of a generally conventional type which includes a barometrically responsive control device and a drogue gun for ballistically firing a slug of substantial weight for accomplishing the parachute deployment. The parachute deployment mechanism 45 includes means for causing a two-second delay between the actuation of the mechanism by the pull on the actuating cable 29 and the actual firing of the slug. The barometrically responsive control device may be of any conventional type which will delay the actual firing of the drogue gun until the barometric or atmospheric pressure indicates that the man 15 is at a low enough altitude to be able to breathe comfortably. After the two-second delay or after the man reaches a safe breathing altitude, the slug is ballistically fired from the drogue gun at an upward and outward angle of approximately 45°. The slug is attached to a lanyard 46 which in turn is attached through a release device 47 to the pilot chute lanyard 48 and a release cable 49. Release mechanism 47 has a clevis 50 slidably mounted therein and a pin 51 connects the clevis 50 to the lanyard 48 and cable 49. Cable 49 has a plurality of pins 52 attached thereto which extend through loops 53 for normally holding the parachute pack 30 closed. Upon pulling of these pins 52 by the pulling of cable 49 the parachute is released from the pack. Lanyard 48 is connected to the pilot chute of the parachute. Thus the pull of the slug on lanyard 46 causes opening of the parachute pack through cable 49 and pulls the pilot chute and main parachute from the parachute pack for rapid deployment. Due to the angular position of the drogue gun the deployment is laterally outwardly from the man 15 as shown in FIGURE 3. This minimizes the adverse effect of tumbling of the man which otherwise might cause entanglement between the parachute lines and the man. The pin 51 of release mechanism 47 has a right angle portion on the upper end thereof which extends through a hole in a terminal fitting 54 connected to a line 55. A cable 56 having a terminal fitting 57 is connected in parallel with the cable 49 for releasing the parachute from the parachute pack 30 in the same manner as heretofore described upon pulling of the cable 56. Cable 56 and line 55 extend through a housing 58 to a conventional D ring positioned on the front of the man which is used for manually deploying the parachute. By pulling the D ring the line 55 through terminal fitting 54 pulls pin 51 to release the pilot parachute lanyard 48 from clevis 50 and opening of the parachute pack by cable 56 causes the normal manual deployment of the parachute.

Referring now more particularly to FIGURES 2 and 6, the important interrelationship between the seat 10, the rocket 12 and the man 15 to the operation of the invention of this system will be considered. The man 15 is appropriately positioned in the seat 10 whereby the center of gravity of the combined seat and man is at the point 60. It has been found from considering the physical characterists of typical flight status military personnel that when seated in the normal position, the location of the combined seat-man center of gravity, point 60, varies only approximately one and one-half inches in a direction perpendicular to the rocket thrust line indicated by arrow 14. It is specifically contemplated by this invention that the angle of the rocket nozzle 13 and the configuration of the seat be specifically selected to cause the seat-man center of gravity point 60 to always be located slightly above the thrust line indicated by arrow 14 and more particularly at a minimum spacing of approximately three-quarters of an inch from such thrust line whereby the maximum spacing is approximately two and one-quarter inches from such thrust line. By establishing this predetermined eccentricity between the thrust line and the center of gravity the seat and man will tend to rotate or tumble slightly in a clockwise direction as the rocket catapulting force is applied which will in turn cause the rocket catapulting force to be applied in a more vertical direction whereby the flight of the seat and man is in an upwardly curving direction as shown by arrows 61 in FIGURE 2. This eliminates the need for a drag line or drag chute to control the direction of flight as is normally employed. Further the rocket is selected to produce a maximum tolerable thrust to achieve maximum altitude and yet to apply such thrust over a short duration of time to prevent violent tumbling from being induced.

While the rocket requirement may differ for various configurations of seats 10, for the seat of a F–106 U.S. Air Force aircraft a rocket having a peak thrust of approximately 6,100 pounds, a total impulse of 2,600 pound seconds, and a duration of 0.372 second has been found to be preferred. The combined seat-man weight is approximately 400 pounds with the F–106 seat. A number of tests employing this rocket and seat in the afore-described system under zero-zero conditions resulted in an average ejection path and sequence as shown in FIGURE 1.

Referring more particularly to FIGURE 1, the physical movement and sequence of events beginning with the ignition of the catapult stage of the rocket is shown. As previously mentioned the upward thrust force produced by the rocket 12 is for a duration of 0.372 second whereupon maximum speed of the seat-man combination is attained. The seat-man proceed upwardly without change for the next 0.628 second or until the 1-second delay in initiator 17 has elapsed whereupon the afore-described seat-man separation occurs. The action and reaction of the seat-man separation force causes the seat and man to assume separate paths of flight as diagrammatically illustrated in FIGURE 2. The man continues on his flight upwardly for an additional period of 2-seconds whereupon the drogue gun fires to deploy the parachute. Actually the inherent time delay between the firing of initiator 17 and the actual actuation of the parachute deployment mechanism 45 causes a nearly ½-second additional delay whereby the drogue gun actually fires after approximately 3½-seconds elapsed time. While the parachute is rapidly extracted from the parachute pack by the drogue gun slug there is an inherent period of time required for accomplishing the full opening of the parachute to a condition susceptible to supporting the man's weight. This was observed to occur at approximately 7½-seconds elapsed time. From FIGURE 1, it may be observed that the parachute deployment occurs and continues through the highest portion of the man's travel thereby assuring the opening of the chute at an ample altitude for a safe recovery from this zero-zero condition. Under high aircraft speed conditions, the more than 3-seconds elapsed time delay from the departure of the seat-man from the aircraft until initiation of the parachute deployment by firing the drogue gun provides ample time for the man to slow to an acceptable speed for opening of the parachute. Moreover the assured 2-second delay between the seat-man separation and the firing of the drogue gun permits the seat and man to become separated by a substantial distance before deployment of the parachute thereby minimizing the possibility of entanglement between the seat and parachute.

Thus it may be seen that an ejection system and cooperating components are provided by this invention which accomplish the afore-recited objectives of the invention and, in particular, assure a safe ejection and recovery of the man under all conditions of altitude and speed. Having fully described our invention it is to be understood that we do not wish to be limited to the details herein set forth or illustrated in the drawings but our invention is of the full scope of the appended claims.

We claim:

1. A personnel escape system for an aircraft comprising, a personnel seat mounted in the aircraft for ejection upwardly, means for ejecting the seat from the aircraft including a thrust producing means mounted on said seat for imparting substantial force thereto for urging said seat a substantial distance upwardly from said aircraft, said thrust producing means positioned to produce an upwardly and forwardly directed thrust from below and behind the seat with such thrust directed slightly below the location of the center of gravity of the combined man and seat, said thrust producing means imparting a thrust for only a short duration for minimizing any tumbling and rolling that tends to occur by reason of misalignment between the direction of thrust and said center of gravity, means for causing separation between the seat and man subsequent to the termination of said thrust, a parachute secured to the man, means for rapidly and automatically deploying said parachute after at least a substantial delay following said seat-man separation, said parachute deploying means arranged to deploy the parachute laterally from the man, means connected between said seat and said parachute deploying means for initiating the operation of said parachute deployment means, and means initiated by the ejection of the seat from the aircraft for automatically causing the operation of said seat-man separating means and said means connected between said seat and said parachute deploying means at a predetermined time after such initiation.

2. A personnel escape system for an aircraft, comprising, a personnel seat releasably mounted in the aircraft for guided ejection movement upwardly, means for ejecting the man and seat upwardly from the aircraft, a thrust producing rocket means mounted on the rear of said seat for imparting substantial force to the seat immediately upon departure of the seat from the aircraft for imparting a substantial upward velocity to the man and seat, said rocket means having a nozzle at the lower end pointed in a direction for producing an upwardly and forwardly directed thrust from below and behind the seat with the direction of such thrust misaligned below the center of gravity of the combined man and seat by a minimum distance of approximately three-quarters of an inch, said rocket means imparting the thrust force for less than a second for minimizing any tumbling and rolling that tends to occur by reason of misalignment between the direction of thrust and said center of gravity, means for releasing the man from the seat and for forceably separating the seat and man, a parachute secured to the man, means for automatically and forceably deploying said parachute after at least a two-second delay following said seat-man separation, and means actuated by the departure of the seat from the aircraft for automatically causing operation of said seat-man separating means approximately one second after such departure and initiation of the operation of said parachute deploying means.

3. A personnel escape system for an aircraft, comprising, a personnel seat mounted in the aircraft for guided upward movement, means for ejecting the seat from the aircraft, a thrust producing means mounted on said seat for imparting substantial force thereto, said thrust producing means positioned to produce an upwardly and forwardly directed thrust from below and behind the seat, means for causing the release of and separation between the seat and man, a parachute secured to the man, means for automatically and forceably deploying said parachute, and means initiated by the departure of the seat from the aircraft for automatically causing the sequential operation of said seat-man releasing and separating means and of said parachute deploying means at predetermined time intervals after such initiation with the time interval between seat-man separation and parachute deployment being of substantial duration for permitting substantial physical separation between the man and the seat before parachute deployment and for allowing the man to achieve maximum upward displacement from the aircraft in low altitude ejections or slowing of the man's air speed in high aircraft speed ejections, as required, before parachute deployment.

4. The system of claim 3 wherein the said means initiated by the seat departure from the aircraft produces approximately a one-second delay before causing said seat-man release and separation and at least a three-second delay before causing parachute deployment from the time of such seat departure.

5. The system of claim 3 wherein said parachute deploying means includes a drogue gun having a slug attached to the pilot chute of the parachute and said drogue gun is aimed laterally outwardly from the man for avoiding entanglement between the man and parachute by reason of tumbling of the man.

6. The system of claim 3 wherein the upward and forward direction of thrust produced is spaced slightly below the center of gravity of the combined seat and man for minimizing tumbling caused by such thrust and insuring that such tumbling will be rearward for further directing the thrust upwardly.

7. The system of claim 6 wherein the perpendicular spacing between the line of thrust and the combined center of gravity is approximately between three-quarters of an inch and two and one-quarter inches.

8. The system of claim 3 wherein the initiation of the actuation of the parachute deployment means is separate and distinct from the physical separation of the seat and man and means are provided on the seat for accomplishing such initiation before seat-man separation and then releasing the seat from the parachute.

9. The system of claim 8 wherein the parachute deployment means includes time delay means for causing approximately a two-second delay from seat-man separation to parachute deployment.

10. The system of claim 9 wherein the parachute deployment means includes a drogue gun directed upwardly and outwardly from the man for firing a slug attached to the pilot chute of the parachute for rapidly deploying the parachute laterally of the man.

11. The system of claim 3 wherein said thrust producing means is a rocket having a thrust producing capacity of a level for imposing a peak thrust of approximately fourteen times the force of gravity.

12. The system of claim 3 wherein said thrust producing means is a rocket having a force producing duration of less than one-half second for minimizing tumbling caused by eccentricity between the thrust direction and the center of gravity of the seat-man combination.

References Cited
UNITED STATES PATENTS

| | | | |
|---|---|---|---|
| 3,020,011 | 2/1962 | Beem et al. | 244—122 X |
| 3,083,938 | 4/1963 | Brinkworth | 244—122 |
| 3,190,589 | 6/1965 | Mennborg | 244—122 |
| 3,191,892 | 6/1965 | Fuller et al. | 244—122 |

MILTON BUCHLER, *Primary Examiner.*

B. BELKIN, *Assistant Examiner.*